United States Patent [19]

Olschewski et al.

[11] 4,278,305
[45] Jul. 14, 1981

[54] LINEAR MOTION BEARING

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 95,225

[22] Filed: Nov. 19, 1979

[30] Foreign Application Priority Data

Dec. 21, 1978 [DE] Fed. Rep. of Germany ....... 2855199

[51] Int. Cl.³ ............................................. F16C 29/06
[52] U.S. Cl. .................................................. 308/6 C
[58] Field of Search ................... 308/6 C; 29/148.4 R, 29/148.4 C, 149.5 R

[56] References Cited

U.S. PATENT DOCUMENTS

| | | | |
|---|---|---|---|
| 3,476,445 | 11/1969 | Carlson et al. | 308/6 C |
| 3,545,826 | 12/1970 | Magee et al. | 308/6 C |
| 3,879,093 | 4/1975 | Betrix | 308/6 C |
| 3,891,284 | 6/1975 | Ernst et al. | 308/6 C |
| 3,975,064 | 8/1976 | Nilsson | 308/6 C |
| 4,128,278 | 12/1978 | Headen et al. | 308/6 C |
| 4,201,424 | 5/1980 | Ernst et al. | 308/6 C |

FOREIGN PATENT DOCUMENTS 2345486  3/1974  Fed. Rep. of Germany .......... 308/6 C

*Primary Examiner*—Richard R. Stearns
*Attorney, Agent, or Firm*—Daniel M. Rosen

[57] ABSTRACT

A linear motion ball bearing having an outer sleeve and a cylindrical ball-guide cage with endless rows of balls axially movable on a central shaft, the cage defining for each row a main guideway for loaded balls engaged by a race plate and a return guideway for unloaded balls, this race plate situated partially in a recess extending radially inward in the cage and partially in a depression extending radially outward in an adjacent portion of the bore surface of the outer sleeve. During assembly of the bearing the race plates are movable radially inward when the cage is inserted axially into the bore of the outer sleeve, and the race plates are moved radially outward into the depressions of the sleeve when balls are inserted in the cage's guideways.

6 Claims, 5 Drawing Figures

LINEAR MOTION BEARING

BACKGROUND OF THE INVENTION

The present invention relates to a linear motion bearing having a plurality of endless rows of rolling elements distributed on the circumference and a cage defining for each endless row a main guideway for loaded rolling elements, a return guideway for nonloaded rolling elements and reversing zones connecting the ends of these guideways. The rows are arranged between the bore of the outer sleeve and the shaft, the bore of the outer sleeve having a depression for each row of elements to accommodate a race plate carrying the loaded elements of the row in question.

During assembly of one known bearing of the kind specified, first the balls and the race plates are inserted in the cage, then the cage is pushed axially into the outer sleeve, and finally an edge at the end of the outer sleeve is deformed by being turned over radially inward for axial retention of the cage in the outer sleeve.

An object of the invention is to provide a linear motion bearing of the type described, that can be assembled economically, without the use of expensive assembly tools. To avert the danger of damage to the cage and balls in the bearings during assembly is a further objective.

SUMMARY OF THE INVENTION

By virtue of the arrangement according to the present invention, the cage, together with the installed race plates, but without the balls, can be axially thrust into the outer sleeve. While this is being done, the race plates are seated without radial clearance in the radial recesses of the cage, these race plates having been thrust radially inward against the floor of each recess in the cage. Upon axial insertion the cage is brought to a definite position in the outer sleeve, so that the race plates lie under the corresponding depressions in the bore of the outer sleeve. Then the rolling elements are introduced from the inside into the cage guideways located under each plate. This may be done for example, by means of known automatic loading magazines.

When introduced, the balls are pushed along the guideway for loaded rolling elements by way of the corresponding reversing zones into the return guideway for unloaded rolling elements, thus forming a closed or endless row of balls or rolling elements. At the same time, the corresponding race plate over the balls is pressed and shifted radially outward into the corresponding depression of the outer sleeve. Arrangements of special retaining means such as spring rings to be snapped into the bore of the outer sleeve for axial and/or rotational fixation of the cage in the outer sleeve are thus dispensed with.

Advantageous embodiments of the invention are described below and in the subsidiary claims.

In a first embodiment the cage will always be in the correct rotational position when thrust axially into the outer sleeve. Thus each race plate can be brought exactly beneath the corresponding depression in the outer sleeve when the cage is inserted in the sleeve.

In another embodiment the race plate can be supported in the depression and/or in the bore of the outer sleeve, so that the bearing forces are transmitted from the stressed balls by way of the race plates to the outer shell.

In a third embodiment, an economically manufactured race plate has a projection that occupies little space in circumferential direction. Accordingly, the corresponding depression in the bore of the outer sleeve causes comparatively little impairment of the strength of the sleeve.

In a fourth embodiment each race plate can be supported directly by its portion projecting radially outward beyond the bore of the outer sleeve, for example, on a seat on a bore surface of a housing adjacent the outer sleeve.

In a fifth embodiment the balls installed in the cage are prevented from dropping out of the bearing inward when the shaft is pulled. Accordingly, the bearing in installed condition constitutes a self-retaining structural unit, since the cage is secured against axial displacement and against rotation in the outer sleeve by the race plates.

The linear motion bearing according to the invention will now be further illustrated by the following description of a preferred embodiment by way of example and as represented in the drawings.

DETAILED DESCRIPTION OF THE PREFERRED EMBODIMENT

Figure 1:
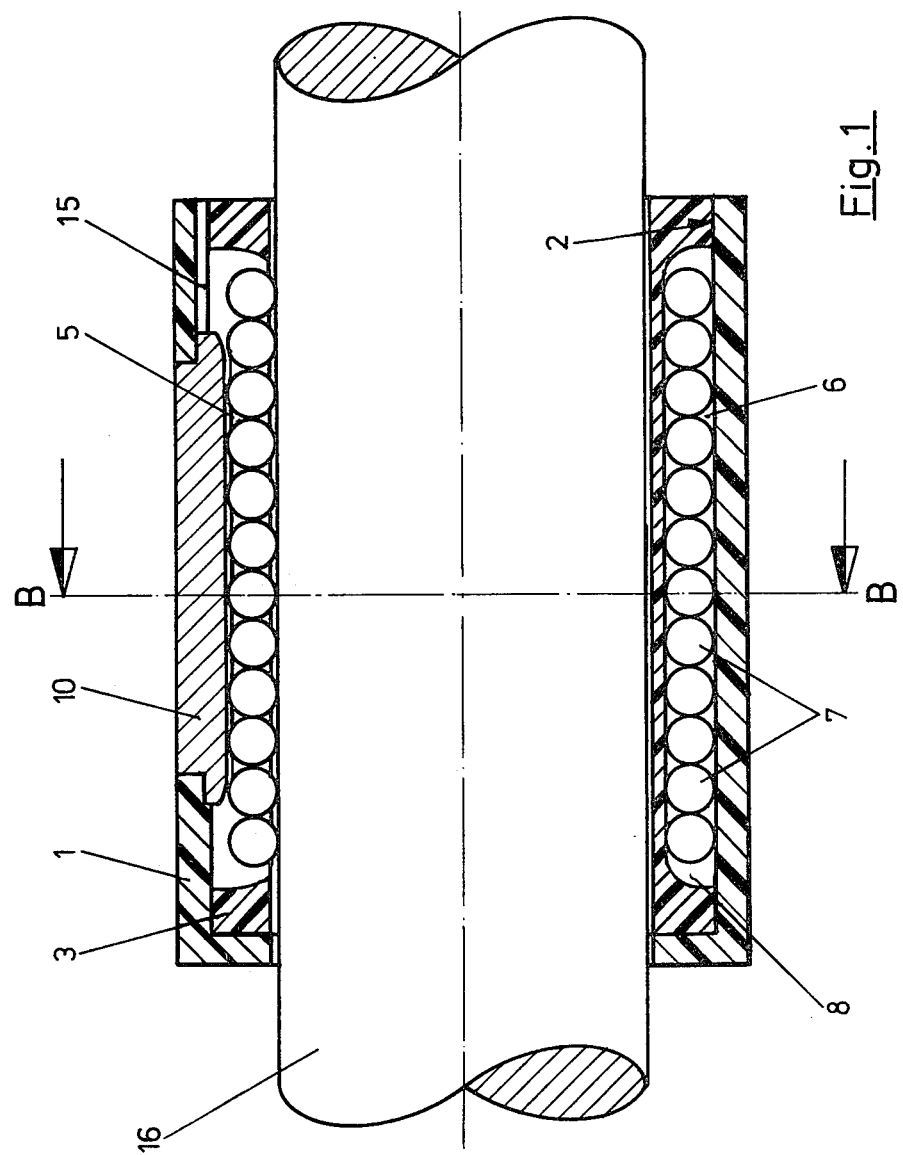
FIG. 1 shows a longitudinal sectional view of a linear motion bearing represented by FIG. 2 and taken along line A—A thereof.
Figure 2:
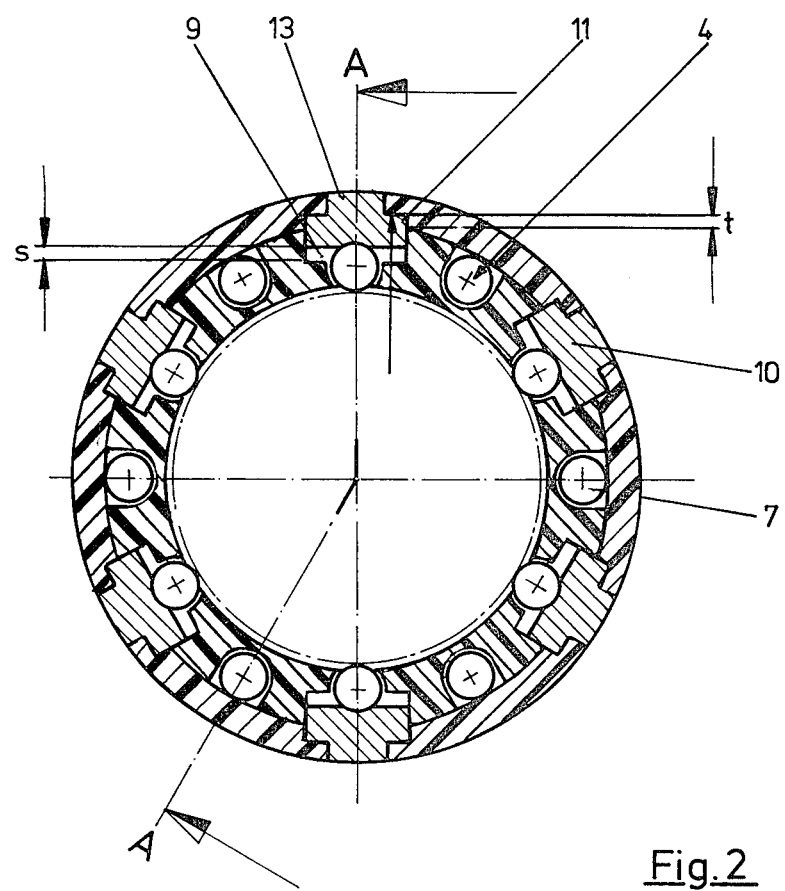
FIG. 2 shows a cross-sectional view of a linear motion bearing represented by FIG. 1 and taken along line B—B thereof with shaft removed.

In FIGS. 1 and 2, 1 designates on outer sleeve in whose cylindrical bore 2 the cage sleeve 3 is installed. The cage 3 guides endless rows 4 of rolling elements evenly distributed over the circumference of cage 3. The rolling elements 7, spherical in this case, of each row 4 travel in an axially extending main guideway 5 for loaded elements, an axially extending return guideway 6 for returning idle or unloaded elements, and semicircular reversing zones 8 of cage 3 connecting the two guideways 5, 6 with each other.

Further, the cage 3 has recesses 9 extending radially inward in its periphery and being coextensive with said main guideway, each occupied by a race plate 10 having an inner side engaging the loaded elements 7 of the corresponding row and an opposite outer side. Between the floor of recesses 9 and the inner side of race plates 10, there is a radial clearance s.

Each race plate 10 has a portion 11 projecting radially outward beyond the bore 2 of the outer sleeve 1 and fitting into a depression 12 formed in the outer sleeve 1. The radial clearance s is at least as great as the depth of penetration t of the race plate 10 into the depression 12 in the outer sleeve 1 (see FIG. 2).

Figure 4:
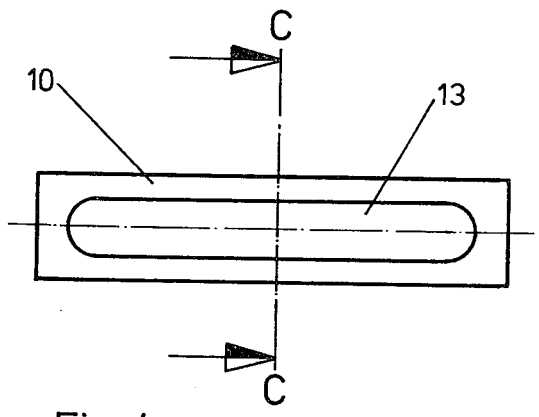
FIG. 4 shows a top view of a single race plate of the bearing shown in FIGS. 1-3.
Figure 5:
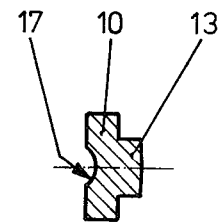
FIG. 5 shows a cross-sectional view of a race plate taken along line C—C in FIG. 4.

Each race plate 10 moreover has a radial projection 13 entering the depression 12 in outer sleeve 1, in the form of a lengthwise rib (see FIGS. 4 and 5) entering the depression 12 which extends radially as opening 14 (see FIG. 3) through the outer sleeve 1.

Figure 3:
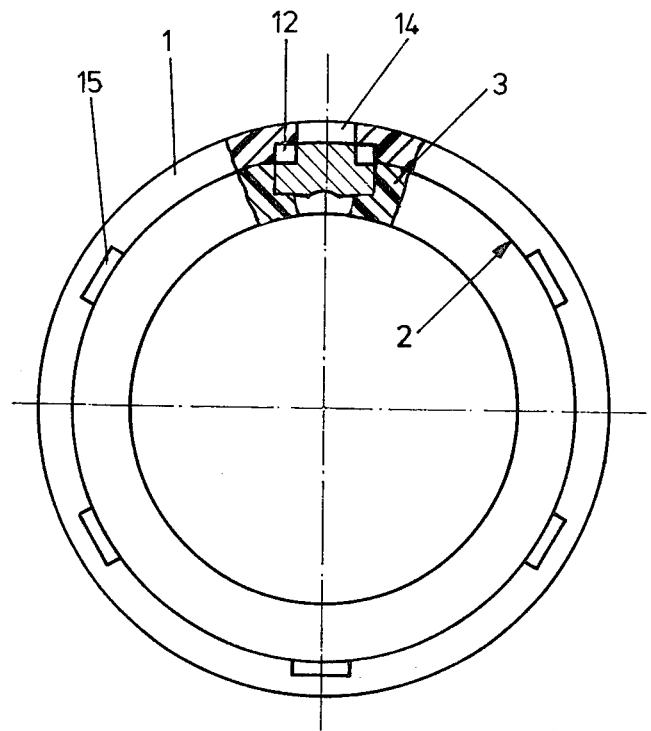
FIG. 3 shows an end view of the outer sleeve of FIGS. 1 and 2, with race plates installed in the outer sleeve prior to loading the balls.

As may be seen in FIG. 3, the outer sleeve 1 has longitudinal grooves 15 in its bore 2 for sliding axial insertion of the cage 3 equipped with race plates 10. The depth and width of these grooves 15 are slightly greater than the portion projecting radially outward beyond the bore 2 of the corresponding race plate 10. In the present case, each race plate has a radial projection 13 molded on the plate 10 in the form of a lengthwise rib.

The plate 10, which may be made of hard bearing steel, has a lengthwise race or bearing surface 17 (see FIG. 5) adapted to the spherical rolling elements 7 on its inner side facing the shaft 16.

In operation, the stressed rolling elements 7 of main guideway 5 roll between the corresponding race plate 10 and the cylindrical shaft 16 moving longitudinally in the bore 2 of the bearing. Thus the shaft 16 transmits a radial load by way of balls 7 to the plate 10, which in turn is supported directly against the bore surface of a housing (not shown). In the present case, therefore, the outer sleeve 1 has no radial load to transmit, and thus may be fabricated economically out of a soft thin-walled tubing.

In assembling the bearing, the race plates 10 are positioned and moved radially into the radial recesses 9 of the cage 3 and secured so that at first the plates 10 have no radial clearance in the cage 3, (s=0). Then the cage 3, together with the plates 10, is threaded into the bore 2 of the outer sleeve 1, so that the projections 13 of plates 10 enter the corresponding longitudinal grooves 15 of the outer sleeve 1 and secure the cage 3 in its proper position rotationally. Now the cage 3 is pushed slidingly far enough into the bore 2 of the outer sleeve 1 so that the race plates 10 will be located under the corresponding depressions 12 of the outer sleeve 1. Then the rolling elements 7 are snapped in radially into the guideways 5. For this purpose, the side walls of the guideways 5, converging radially inward, are elastically yieldable in circumferential direction, the cage 3 being made of an elastic material, for example, synthetic material. As the rolling elements 7 are snapped radially into the guideways 5, for example, by means of known loading magazines, the race plates 10 are forced radially outward and shifted towards the outside so that the radially outer portion of the plate enters the corresponding depression 12, and the rib 13 enters the opening 14 in the outer sleeve 1. The resulting radial clearance s of each plate 10 in the radial recess 9 is consequently at least as great as the depth of penetration t of the portion projecting radially outward into the depression 12 of the outer sleeve 1 of the plates 10. Consequently, the cage is locked in the outer sleeve 1, so that it is axially and rotationally secured in the outer sleeve 1 by the race plates 10 shifted radially outward. The balls 10 cannot drop out of the bearing inward, even if the shaft 16 is pulled. Furthermore, the assembled bearing, as a self-contained unit, is easily stored or transported.

The bearing according to the invention has the great advantage that it can be assembled economically, without the use of expensive tools. Also, the danger that the cage and balls of the bearing may be damaged during assembly is averted.

Within the scope of this invention, the abovedescribed linear motion bearing may be modified. For example, the outer sleeve may be provided with radial depressions which do not extend radially through the outer sleeve wall, so that the race plates are supported by the floor of the corresponding depressions in the outer sleeve. Then no radial projection need be molded on the race plates.

It is also possible to dispense with the longitudinal grooves made in the bore of the outer sleeve. In that case, when axially inserting the cage equipped with race plates into the outer sleeve, care must be taken to rotate the cage into its proper position so that at the end of the insertion the race plates will lie just beneath the radial depressions in the outer sleeve. When the rolling elements are loaded into the main guideways, the race plates are pushed radially outward into the depressions.

The bore of the outer sleeve need not be cylindrical, but may alternatively have a polygonal cross-section, matching the outer contour of the cage, so that the cage is held securely against rotation in the bore of the outer sleeve.

Finally, the rolling elements need not be spherical; rather, with suitable conformation of the associated guideways and reversing zones in the cage and of the race groove in the plate, the rolling elements, may alternatively be in the form of rollers having a barrel-shaped or cylindrical periphery.

Other variations, modifications, omissions or additions within the spirit and scope of the invention will be apparent to those skilled in the art.

What is claimed is:

1. In a linear motion bearing operable with a central shaft, the bearing including an outer sleeve with a bore surface, a cylindrical cage situated within said bore and having an outer surface adjacent said bore surface, a plurality of rolling elements formed in endless rows distributed circumferentially around said cage, said cage defining for each endless row a main guideway for loaded rolling elements, a return guideway for non-loaded rolling elements, and reversing zones connecting the ends of said guideways, and a race plate having an inner side adjacent and engaging the rolling elements in each of said main guideways and an opposite outer side; the improvement wherein said outer sleeve bore surface defines therein a depression extending radially outward for accommodating each of said race plates, said cage defines in its outer surface a recess extending radially inward, being coextensive with a main guideway, and defining a floor for receiving a race plate, each race plate being positionable in a radially inward position where it engages at least in part the floor of a recess while its outer surface does not extend radially beyond the cage's outer surface, and each race plate also being movable radially outward to an outward position where it extends radially into one of said depressions by a depth t therein with a clearance depth s defined between the race plate's inner surface and said recess floor, depth s being at least as great at depth t whereby said cage and race plates in their inward positions are axially insertable into said bore until each recess is adjacent one of said outer sleeve depressions, and whereby said race plates in their outward positions permit said rolling elements to be inserted between each race plate's inner surface and said central shaft.

2. A bearing according to claim 1 wherein each race plate, when situated in its radially inward position has a portion defined by width and depth and extending radially outward beyond the cage's outer surface, and wherein said bore surface further comprises for each race plate a groove coaxial with one of said depressions, and having width and depth corresponding to and slightly greater than said width and depth of said radially extending portion of each race plate, whereby said cage is slidable axially in said bore with said radially extending portions of the race plates slidable in said grooves, thereby aligning said cage and race plates with said depressions.

3. A bearing according to claim 2 wherein each of said race plates has a rib extending axially and radially outward, each rib situated such that it extends at least partially into one of said depressions when said cage and race plates are axially and rotatably positioned in said bore such that said race plates are adjacent corresponding depressions.

4. A bearing according to claim 1 wherein each of said race plates further comprises a projection extending radially outward from its outer surface for entering one of said depressions in the outer sleeve.

5. A bearing according to claim 4 assembled with a housing that is radially outward of said outer sleeve, wherein each of said depressions in said bore surface extends completely through the outer sleeve and each of said projections extends radially outward through one of said depressions and engages said housing.

6. A bearing according to claim 1 wherein said cage comprises elastic material which is resiliently deflectable for receiving said rolling elements in said guideways, and for urging said rolling elements and race plates radially outward and thereby retaining said rolling elements in the absence of said central shaft.

* * * * *

UNITED STATES PATENT AND TRADEMARK OFFICE
CERTIFICATE OF CORRECTION

PATENT NO. : 4,278,305

DATED : July 14, 1981

INVENTOR(S) : Armin Olschewski et al

It is certified that error appears in the above-identified patent and that said Letters Patent is hereby corrected as shown below:

Column 2, lines 3 and 14, insert --the-- after "in".

Column 4, line 53, change "at" (second occurrence) to --as--.

Signed and Sealed this

Thirteenth Day of November 1984

[SEAL]

Attest:

GERALD J. MOSSINGHOFF

Attesting Officer — Commissioner of Patents and Trademarks